United States Patent [19]

Puckett

[11] Patent Number: 4,681,805

[45] Date of Patent: Jul. 21, 1987

[54] STRANDS OF CHEMICALLY TREATED GLASS FIBERS HAVING A REDUCED TENDENCY TO GIVE GUMMING DEPOSITS

[75] Inventor: Garry D. Puckett, Salisbury, N.C.

[73] Assignee: PPG Industries, Inc., Pittsburgh, Pa.

[21] Appl. No.: 812,038

[22] Filed: Dec. 23, 1985

[51] Int. Cl.$^4$ .................................................. D02G 3/00
[52] U.S. Cl. ........................................ 428/391; 428/375; 428/378; 428/392; 428/394; 428/364; 65/3.41; 65/3.43; 65/3.44
[58] Field of Search ................ 428/375, 378, 391, 392, 428/394, 364; 65/3.41, 3.43, 3.44

[56] References Cited

U.S. PATENT DOCUMENTS

| | | | |
|---|---|---|---|
| 3,227,192 | 1/1966 | Griffiths | 428/375 |
| 3,265,516 | 8/1966 | Triplett et al. | 428/375 |
| 3,503,794 | 3/1970 | Donermeyer et al. | 428/375 |
| 3,591,408 | 7/1971 | Marzocchi et al. | 428/375 |
| 3,723,173 | 3/1973 | Schonfeldt | 428/375 |
| 3,870,547 | 3/1975 | Workman et al. | 161/93 |
| 3,873,353 | 3/1975 | Wincklhofer et al. | 428/378 |
| 4,002,445 | 1/1977 | Graham | 65/3 R |
| 4,039,716 | 8/1977 | Johnson | 428/378 |
| 4,049,597 | 9/1977 | Motsinger | 428/378 |
| 4,052,257 | 10/1977 | Hill et al. | 162/156 |
| 4,096,104 | 6/1978 | Spain et al. | 428/364 |
| 4,221,602 | 9/1980 | Walser | 408/378 |
| 4,233,046 | 11/1980 | Walser | 428/378 |
| 4,259,190 | 3/1981 | Fahey | 428/378 |
| 4,265,704 | 5/1981 | Nahta | 162/156 |
| 4,296,173 | 10/1981 | Fahey | 428/378 |
| 4,341,597 | 7/1982 | Andersson et al. | 162/127 |
| 4,347,278 | 8/1982 | Flautt et al. | 428/288 |
| 4,390,647 | 6/1983 | Girgis | 523/212 |
| 4,394,414 | 7/1983 | Brown et al. | 428/288 |
| 4,397,913 | 8/1983 | Fahey | 428/375 |
| 4,457,785 | 7/1984 | Hsu et al. | 162/156 |
| 4,461,804 | 7/1984 | Motsinger et al. | 428/392 |
| 4,487,797 | 12/1984 | Watson | 428/392 |
| 4,592,956 | 6/1986 | Gaa et al. | 428/391 |

FOREIGN PATENT DOCUMENTS 1321847 2/1963 France.

OTHER PUBLICATIONS

BASF Wyandotte Nonionic Surfactants Product Bulletin.
A. E. Staley Mfg., Co. Products Bulletin, Staley Industrial Products Stadex ® Dextrins.

*Primary Examiner*—Lorraine T. Kendell
*Assistant Examiner*—S. A. Gibson
*Attorney, Agent, or Firm*—Kenneth J. Stachel

[57] ABSTRACT

Strands of starch-oil chemically treated glass fibers can have improved performance in high humidity environments. Such strands have a sole starch, film-former modifier which is a poly(oxypropylene) organic alcohol. Starch-oil sizings for treating glass fibers having polyethylene glycol are converted to improved starch-oil sizing compositions by substituting the poly(oxypropylene) organic alcohol for the polyethylene glycol. The strands of chemically treated glass fibers with improved high humidity performance are also made more lubricious by having a moisture-reduced residue of the starch-oil aqueous chemical treating composition with the poly(oxypropylene) organic alcohol. The more lubricious characteristic is effected by having present a starch mixture of a high amylose cationic starch and a highly crosslinked starch of approximately 50 percent amylose and wax in an amount less than the starch mixture but more than the oil and a cationic lubricant wetting agent and bacteriocide or fungicide. The moisture-reduced residue is present on the glass fibers in an amount of about 0.1 to about 2 weight percent LOI.

17 Claims, No Drawings

STRANDS OF CHEMICALLY TREATED GLASS FIBERS HAVING A REDUCED TENDENCY TO GIVE GUMMING DEPOSITS

The present invention is directed to strands of chemically treated glass fibers, wherein the chemical treatment is a moisture reduced residue of a starch-oil sizing composition. Typically such glass fibers have found utilization in the reinforced tape industry.

For some time, the glass fiber manufacturing industry has produced starch-oil treated glass fibers in the form of strands, yarn and the like for the textile industry and the fiber reinforced tape industry. Typically the glass fibers, which are formed from a multitude of fine streams of molten glass flowing from small openings in a bushing, are treated with the starch-oil sizing composition during their formation or attenuation. The chemical treating composition or sizing composition of starch-oil protects the fibers from interfilament abrasion when they are gathered into a bundle of fibers such as strands and yarn. In addition, the sizing composition provides the lubricity needed for the strands to traverse numerous physical contact points in processing in the textile and reinforce tape industries. A multitude of various starches have been used in the starch-oil sizing compositions, where the starches have been modified to improve the non-migration of the size from glass fibers at one portion in a package of strands to the outside of the package. Also sundry additional ingredients have been used in the starch-oil sizing composition in attempting to provide lubricious, non-migratory, film protecting characteristics to the strands of chemically treated glass fibers. After the glass fibers are formed and treated with the starch-oil sizing composition, they are gathered into one or more strands and wound onto a tube or spool to produce a multilayered package. The winder provides for the attenuation of the fibers and also the winding of the strands onto the package. The packages are typically placed in an oven to dry or are allowed to air dry to reduce the moisture content of the strand in order to facilitate removal of the strand from the package. Such strands of glass fibers can be removed from the dried package and twisted to produce yarn according to any conventional textile twisting techniques such as winding the strands on a twist frame and collecting them on a bobbin.

The proportions of starch, oil, and other additives and the types of starch, oil, and other additives in sizing compositions have been varied to suit various requirements. For example, in U.S. Pat. No. 3,227,192 (Griffiths) a sized glass fabric and method are disclosed wherein the aqueous size contains as the binder ingredient an amylose containing starch mixture, having an amylose content of about 35 to 45 percent by weight based on total starch content. The mixture is formed by mixing approximately equal portions of a high amylose starch fraction, wherein the remainder of starch is amylopectin, and of a water repellent low amylose starch fraction, wherein the greater portion of the remainder is amylopectin. Also in U.S. Pat. No. 3,615,311 (Ignatius) a starch size composition is disclosed for coating glass fibers, which has greatly improved drying properties. The starch size composition includes a relatively narrow range of a non-crosslinked cationic starch, which is made cationic by attaching a nitrogen or phosphorous having an unshared pair of electrons thereon to a natural starch molecule, and an underivatized starch that is preferably high in amylose, where a portion of the granules are incompletely burst. Also, in U.S. Pat. No. 3,869,308 (Graham) a method of producing an improved sized glass fiber strand suitable for plastisol coating is disclosed. The starch based forming size used to coat the glass fiber strand contains a starch, the salt of a polyamino-functional polyamide resin and a carboxylic acid, a wax and fatty triglyceride.

In the tape reinforcement industry, the glass fiber strands are used chiefly in the form of nonwoven materials to reinforce paper, film and foil laminates, and sealing tapes for cartons and box corners. In preparing tape products of glass fiber strands, the strands must pass through machinery guide bars and other orientation devices. For example, the glass fiber strands are oriented by a meir bar for proper alignment before coming in contact with the tape material. Manufacturers of glass fiber reinforced tape material have encountered difficulty in producing the glass fiber reinforced tape under high relative humidity conditions. Under these conditions the current sizing compositions used on glass fibers to protect them from breaking, when the glass fiber strands are handled and manipulated through machinery, has a tendency to leave gummy deposits on guide bars or orientation devices like the meir bar. The accumulation of the gummy deposits hampers processability by increasing break-outs of the fibers, causing fuzz, and initiating strand jumping from meir bar slots. Recent approaches to overcoming the high humidity gummy deposit problem are illustrated in U.S. Pat. Nos. 4,221;602; 4,233,046; 4,259,190 and 4,296,173. These approaches involved modifications to the starch in a starch-oil size and the use of different oil and wax emulsifiers in the size.

It is an object of the present invention to provide strands of chemically treated glass fibers having a reduced tendency to form gumming deposits on fabrication equipment, particularly under high relative humidity conditions and preferably also to provide glass fiber strands having reduced drag characteristics and high quality.

SUMMARY OF THE INVENTION

The aforementioned objects are accomplished by strands of chemically treated glass fibers, where the chemical treatment is a moisture reduced residue of an aqueous starch-oil chemical treating composition. In addition to the starch, oil, and water, the aqueous starch-oil composition has a liquid, water soluble, poly(oxypropylene) organic alcohol like glycol or polyol essentially free of any ethylene oxide moieties. This poly(oxypropylene) glycol or polyol is present as the exclusive starch film forming modifier. Any starch-oil aqueous chemical treating composition for glass fibers can benefit from the present invention by using the poly(oxypropylene) glycol or polyol in lieu of any ethylene glycol or poly(oxyethylene) glycol or polyol used as a starch, film forming modifier.

In the broadest aspect of the present invention, the strands of the chemically treated glass fibers have a moisture-reduced residue of an aqueous starch-oil sizing composition which has an effective film forming amount of starch, an effective lubricating amount of oil with an appropriate oil emulsifier or dispersant in an effective amount, an effective amount of the poly(oxypropylene) glycol or polyol for modifying a starch film, and water in an effective amount to apply the aqueous chemical treating composition to glass fibers principally during their formation. Generally the moisture reduced residue allows for a moisture content of the glass fibers in the range of up to around 12 weight percent. The moisture reduction can be accomplished by oven drying or air drying at suitable periods of time to accomplish the desired result.

The present invention in a narrower aspect is directed to strands of chemically treated glass fibers having a moisture-reduced residue of an aqueous chemical treating composition having several components in addition to the aforementioned components. These include: wax in an effective emulsifying or dispersing amounts wax emulsifier, cationic lubricant in an effective cationic lubricating amount, a wetting agent in an effective amount, and an antimicrobial compound in an effective amount. Generally the amount of the starch-oil chemical treating composition with the poly(oxypropylene) glycol or polyol present on the glass fibers is in the range of about 0.1 to about 2 percent by weight based on the weight of the chemically treated glass fibers.

DETAILED DESCRIPTION OF THE INVENTION

In the aqueous chemical treating composition of the present invention, any standard starch, oil, and emulsifier for emulsifying the oil in water that are known to those skilled in the art of treating glass fibers with starch oil sizing compositions can be used. Nonexclusive examples of starches, which are mixtures of starches and chemically modified starches, oils, and oil emulsifiers useful in the present invention are given in U.S. Pat. Nos. 4,221,602; 4,233,046; 4,296,173; 4,259,190; 3,227,192; 3,265,516; 4,002,445, all of which are hereby incorporated by reference. In addition, mixtures and combinations of the various starches and various oils known to those skilled in the art can be used. The effective film forming amount of the starch is generally in the range of around 50 to 75 weight percent of the nonaqueous components of the aqueous chemical treating composition. Nonexclusive examples of starch mixtures that can be used as detailed in the aforementioned patents that were incorporated by reference include a high amylose starch and a low amylose starch mixture. The low amylose starch is usually derived from potato or derivatized corn starch such as cationic, phosphatized, ethoxylated or esterified derivatives and it is present in an amount of around 20 to 30 percent by weight of the mixture. The high amylose starch which is present in an amount of around 50 to 60 percent by weight of the nonaqueous components of the aqueous chemical treating composition usually contains around 55 percent by weight amylose with the remainder being amylopectin. The total amylose content of the starch mixture is generally in the range of about 35 to about 55 percent by weight of the total starch content. It is preferred to utilize a starch mixture to address any problem of winding the strands of glass fibers in a manner to have good package build. A most suitable starch mixture is one having around 75 weight percent to about 95 percent of a underivatized, high amylose starch and around 5 percent of a cationic corn starch with 50 percent amylose and granules having a diameter in the range of 3 to 20 nanometers. Nonexclusive examples of the nonionic oil lubricants that can be used include vegetable oils and hydrogenated vegetable oils where the oils are: cotton seed oil, corn oil, soybean oil, fatty triglyceride, their hydrogenation products and the like. Nonexclusiva examples of suitable emulsifiers or dispersants for the oils are those that are nonionic and that have an HLB in the range of about 8 to about 20 or any mixtures of emulsifiers and dispersants yielding an HLB in this range.

The aqueous chemical treating composition of the present invention also has a non-humectant, poly(oxypropylene) glycol or polyol. This glycol or polyol material is a liquid and is water soluble. Generally, poly(oxypropylene) glycols and polyols having a molecular weight range of around 150 to 4,000 are liquid and water soluble. In selecting an appropriate poly(oxypropylene) glycol or polyol, the molecular weight should be toward the lower end of the range if a greater degree of water solubility is needed. Also, depending on the temperature of use of the aqueous chemical treating composition and on the use of the chemically treated glass fibers, the poly(oxypropylene) glycol or polyol should not have too high a molecular weight since at higher temperatures the water solubility of these materials decreases due to disassociation of the hydrates. The combined effect of a high molecular weight and high use temperatures might prove problematic in maintaining water solubility. The poly(oxypropylene) glycol or polyol can be a homopolymer or copolymer in the atactic or isotactic form which is substantially free of ethylene oxide moieties. These materials can be formed from reaction orf propylene glycol and glycols, triols and other polyols with the use of conventional catalysts. Polyethylene glycol present in starch-oil chemical treating compositions for glass fibers is believed to function to modify the starch film on the fibers in a manner characterized as plasticization. The poly(oxypropylene) glycol or polyol functions in a similar manner. Any amount of poly(oxypropylene) glycol or polyol which accomplishes the film-modifying function of plasticizing the starch film is an effective amount of the poly(oxypropylene) glycol or polyol. In substituting poly(oxypropylene) glycol or polyol for any polyethylene glycol present in a starch-oil size, the amount of the poly(oxypropylene) glycol or polyol is adjusted for any molecular weight differences from that of the polyethylene glycol. Typically, the amount of poly(oxypropylene) glycol or polyol present in the aqueous chemical treating composition of the present invention is in the range of about 4 to about 8 weight percent of the nonaqueous components of the chemical treating composition. Nonexclusive examples of poly(oxypropylene) glycols or polyols that can be used include the diol type materials present under the trade designation "PPG" having molecular weights from 400 to 2,000 available from Jefferson Chemical Company and the diol materials available under the trade designation "Poly-G" with molecular weights ranging from 400 to 2,000 available from Olin Matheison Chemical Corporation, also the Pluracol ® P glycols having a molecular weight range of 400 to 4,000 available from Wyandotte Chemical Corporation can be used, as can the poly(oxypropylene) adducts of trimethylol propane, a triol type material available under the trade designation "Pluracol ® TP" with molecular weight ranges of 300 to 4,000. In addition, octyl type polyol materials such as poly(oxypropylene) adducts of sucrose available under the trade name "Voranol" with a molecular weight of 800 available from Dow Chemical Company can also be used as well as triols and tetrols and hexols that are essentially free of ethylene oxide moieties. It is preferred to use a glycol type poly(oxypropylene) glycol homopolymer having a molecular weight in the range of around 400 to around 450 weight or number average molecular weight.

A particularly desirable starch-oil chemical treatment of the present invention incorporates the characteristic of good lubricity achieved with dry lubricants for the chemically treated glass fibers. Achieving this lubriciousness involves utilizing a wax in the starch-oil chemical treating composition. Any conventional wax known to those skilled in the art for use in chemical treatments for glass fibers can be used, and a few nonexclusive examples include animal waxes, mineral waxes, synthetic waxes, petroleum waxes, paraffin wax, and microcrystalline waxes. The amount of the wax utilized in the present invention can range from 0 to 1.5 weight percent of the aqueous chemical treating composition and from 0 to about 35 weight percent of the nonaqueous solids of the aqueous chemical treating composition. The wax is present in an amount less than the amount of the starch but preferably more than the amount of the oil and most preferably in an amount in a ratio to the amount of oil in the range of greater than 1:1 to 3:1. In utilizing the wax to achieve lubricious strands, one or more wax emulsifiers are added to the aqueous chemical treating composition, or the amount of the oil emulsifier is increased to improve the emulsion stability of the aqueous chemical treating composition. The resultant, more lubricious chemically treated glass fibers should not be too lubricious to engender complications in producing a wound package of the lubricious strands of glass fibers.

In addition to the starch, oil, polyoxypropylene glycol or polyol, wax, and water, other ingredients may be present in the aqueous chemical treating composition utilized in the present invention. Nonexclusive examples of ingredients typically present in starch oil sizing compositions include: one or more cationic lubricants, one or more wetting agents, one or more organic inorganic coupling agents, one or more antimicrobial agents and the like. The amounts of these materials present in the aqueous chemical treating composition can be conventional amounts known to those skilled in the art.

In producing the preferred, more lubricious chemically treated glass fiber of the present invention, it is preferred to have an increased amount of wetting agent that is around double the traditional amount and which is in the range of about 0.1 to about 0.5 weight percent of the nonaqueous components of the aqueous chemical treating composition, although greater amounts could be used with diminished returns. Nonexclusive examples of particular types of these additional ingredients include: cationic lubricants, such as alkyl imidazoline reaction products of tetraethylene pentamine and stearic acid like Cation X and Proctor 4764, wetting agent such as octyl phenoxypoly-(ethylene oxy) ethanol available as Igepal ® CA-630 material; and antimicrobial agents such as organotin bactericides and methylene thiocyanate bactericides, and organic inorganic coupling agents such as silane coupling agents like gamma aminopropyltriethoxy silane, polyamino, organo-functional silanes, gamma methacryloxypropyltrimethoxy silane, and the like. Also a polyamino functional polyamide resin may be present, and a typical example is the Versamid 140 material having an amine value of 370 to 400 available from General Mills. The wetting agent which is used can be cationic or nonionic, and it can also serve as an additional lubricant. Any wetting agent which is conventionally known to be useful as such and which will reduce the surface tension of the aqueous chemical treating composition so that it is about 25 to 35 dynes per square centimeter can be used.

In addition to the aforementioned ingredients for the aqueous chemical treating composition, water is present in an amount to facilitate the application of the aqueous chemical treating composition to the glass fibers preferably during their formation. To this end, the total solids (non-aqueous) content of the aqueous chemical treating composition is around 1 to 20 weight percent and preferably around 3 to 10 weight percent. The total solids should be adjusted whereby the level of the size solution is acceptable for application to the glass fibers. For example in a sizing composition which is predominantly water, the viscosity is between 10 to around 50 centipoise at 60° C. Thickening agents can also be used to increase the viscosity of the chemical treating composition in sizes that have a lesser amount of water. Any thickening agents known to those skilled in the art can be used.

The aqueous chemical treating composition utilized in the present invention can be prepared by any method known to those skilled in the art for preparing the stable starch-oil sizing compositions. The aqueous chemical treating composition can be applied to glass fibers during their formation where the glass fibers have any filament diameter commercially available and have been formed from any fiberizable glass batch material known to those skilled in the art. For example, glass fibers of the type "621-glass" and "E-glass" and lower or free boron and/or fluorine derivatives thereof can be used. The filament diameters of the glass fibers generally range from around less than 3 to more than 30 microns. The glass fibers can be gathered into any strand constructions known to those skilled in the art. For example, the strand constructions can be G fibers in a G-150 strand construction with fractional twist. The aqueous chemical treating composition is applied to the glass fibers to result in treated glass fibers having about 0.1 to about 1.2 weight percent of the treating composition and preferably less than 1 weight percent based on a loss on ignition (LOI) basis. The loss on ignition test is a well known technique for determining the amount of coating on glass fibers. It involves weighing the coated glass fiber strand and burning the coating off the glass fiber strand to determine the weight of the strand without the coating. The strands of glass fibers treated with the aqueous chemical treating composition are collected into multilayered packages and dried to reduce the moisture content of the package. The resultant moisture-reduced residue of the aqueous chemical treating composition on the glass fibers in the package has a moisture content in the range of about 1 to about 15 weight percent of the package. The moisture reduction is accomplished by drying the packages in an oven at conventional temperatures and conventional times or by air drying for conventional time periods.

To further illustrate the present invention and to present the preferred embodiment, reference should be made to the following example.

PREFERRED EMBODIMENT OF THE INVENTION

An aqueous chemical treating composition was prepared from the ingredients indicated below in Table A.

TABLE A

| Ingredients | Grams |
| --- | --- |
| Cato-75 | around 2000 to 2040 |
| Amaizo-213 | around 90 to 120 |
| Paraffin Wax | around 530 to 550 |
| Eclipse 102 | around 210 to 240 |
| Tween 81 | around 80 to 100 |
| Proctor 4764 | around 90 to 120 |
| PPG-425 | around 190 to 210 |
| Igepal CA-630 | around 5 to 15 |
| Biomet 66 | around .1 to 1 |
| Water | Sufficient for 10 gal. (38.75 L) |

The aqueous chemical treating composition utilized a starch mixture which was prepared by adding the individual starch components, e.g., the high amylose underivatized starch component and a low amylose starch component to water which previously has been placed in a mixing tank.

Preferably, the high amylose content starch is added first with agitation followed by the addition of the low amylose content starch component. The agitation is continued at an elevated temperature until substantially all of the lumps of the starch are in a suspension. The starch mixture is then heated (cooked) at a temperature and pressure sufficient to allow the starch mixture to enter into a suspension. Generally, the temperature is from about 190° F. (88° C.) to 260° F. (127° C.) and more preferably from about 200° F. (94° C.) to 240° F. (116° C.) in a pressure cooker, e.g., the Jet, Auger or Batch type, at a pressure of from about 5 to about 40 psi (gauge) (0.35 to 2.8 kg/cm$^2$) for a sufficient period of time to allow the components to go into suspension, e.g., for jet cooking a period of about 0.5 to 12 lbs/minute (6 kg/min) of starch in slurry form, depending on the size of the jet cooker. Any cooker known to those skilled in the art of cooking starch can be used at suitable conditions to yield the degree of cooking similar to that obtained with the jet cooker. In a separation mixing vessel the wax is added and melted. After the wax is melted and at a temperature of around at least 66° C., the lubricant (oil) and emulsifiers, as an emulsifying system, are added. With agitation, hot water (approximately 80° C.) is added slowly until inversion to oil-in-water emulsion occurs. Then some additional water is added, which is around one half that needed for inversion. This emulsion is added to the cooked starch mixture.

In a separate premix tank, around 25 gallons of cold water was added. The Cation X cationic lubricant was added and the temperature was brought to 145 ±5° F. and the mixture agitated. The diluted cationic lubricant is added to the main mix tank after the temperature has dropped below 150° F. (66° C.) and the starch cook cycle is completed. The specified amount of the Biomet 66 fungicide was added to the main mix tank. The material was mixed by an Eppenbach mixer for around 10 minutes and diluted to final volume with 140° F. (60° C.) water.

The sizing composition was used to treat G-±50 ±/0 glass fiber strand in a conventional manner. The sizing composition was applied to the fibers prior to the time they were gathered together to form a strand containing 150 fibers by means of a roller applicator which is partially submerged in the sizing solution contained in a reservoir. Such an applicator is shown in more detail in U.S. Pat. No. 2,728,972, hereby incorporated by reference. The fibers were gathered into strands by a gathering shoe and wound onto a forming package rotating approximately at 4,420 rpm to produce a strand travel speed of approximately 14,000 feet per minute. Other methods of applying the sizing composition to the strands of glass fibers, such as a pad applicator, may be employed and a strand may be formed by means other than winding on the forming tube, such as by means of a pair of rotating wheel pullers which direct fibers into a suitable collecting device.

The glass fiber strands wound on the forming package were then unwound onto a bobbin by mounting the forming package on a twist frame and removing the strand from the forming package and placing it on a bobbin. During the unwinding and rewinding step, a twist is imparted into the strand which provides integrity for subsequent processing.

The percent LOI of the air-dried, twisted sized glass fibers was about 1.115. These fiber strands were tested at a relative humidity of around 85±5 percent and at a temperature of 90±2° F. The testing was performed by using a meir bar between the beam or bobbins of glass fiber strands and the size box of a slashing unit and enclosing the area with a plastic tent in which the humidity could be maintained at some relatively high level. In addition, tensioning rolls were placed before the meir bar. The run speed during the evaluation was 100 to 125 yards per minute and 5,000 yards of glass fiber strand were removed during evaluation with no problem. During this microwarping evaluation, the tensioning post had no build-up of material and the front comb had only moderate shedding and trace lint. The meir bar had no build-up and the back comb had only a trace of shedding, while the eyelets had only a trace of line. Therefore, the forming package, which had excellent shoulders with no soft shoulder problem and the good processibility of the sized glass fibers, maintained good performance under high humidity conditions by reducing the amount of gumming deposits on fabrication machinery.

In addition to the glass fibers chemically treated with the aqueous chemical treating composition of Example of Table A, glass fibers were chemically treated with the chemical treating composition of the illustrative example No. 1 in Table 1. These glass fibers were also formed into G-150 1/0 0.7Z twist. In addition, Table 1 shows illustrative examples of how conventional starch-oil sizing compositions can be modified to substitute the poly(oxypropylene) glycol for polyethylene glycol in appropriate amounts. Illustrative examples 2 and 3 of Table 1 show the aqueous sizing composition of Example V of U.S. Pat. No. 3,265,516 with poly (oxypropylene) gilycol utilized in the specified amount insead of the 300 grams of poly (ethlene) glycol utilized in U.S. Pat. No. 3,265,516. Illustrative example 3 shows the use of the specified amount of poly(oxypropylene) glycol substituted for the 60 pounds or 200 grams of poly (ethylene) glycol in example 1 of U.S. Pat. No. 3,227,192. These examples show how starch-oil sizing compositions could be made utilizing the aqueous chemical treating composition utilzed in the present invention.

TABLE 1

| Materials | Ill. Example gm | Eg. 2 V | Eg. 3 Eg. 1 |
|---|---|---|---|
| STARCH: | | | |
| (a) Hydroxylated amylose | — | 1,000 | — |
| (b) Partially cross-linked corn starch | — | 300 | 998 |
| (c) Acid treated corn starch | — | 300 | — |
| (d) Fractionated potato starch 55% amylose (National 1554) | — | — | 998 |
| (e) Cationic starch (Cato-75) | 2129 | — | — |
| OIL: | | | |
| (a) Hydrogenated soybean oil (Eclipse 102) | 593 | — | — |
| (b) Hdydrogenated cottonseed oil (Pureco oil) | — | 600 | 449 |
| OIL EMULSIFIERS: | | | |
| Tween 81 (ethylene oxide derivative of sorbitol ester) | 50 | 80 | 100 |
| CATIONIC LUBRICANT: | | | |
| (a) Cation X lubricant | — | 176 | 200 |
| (b) Proctor 4764 lubricant | 103.4 | — | — |
| FILM FORMER MODIFIER (PLASTICIZER) | | | |
| (a) Polyethylene glycol (Carbowax 300) | 332 | — | — |
| (b) Poly(oxypropylene) glycol 425 | — | 181 | 144.7 |
| WETTING AGENT: | | | |
| Igepal CA-630 material | 5 | — | 15.4 ml |
| Wax | 148 | — | — |
| Diglycol stearate | — | 30 | — |
| BACTERIOCIDE: | | | |
| C—Sm-6 organotin material | — | — | 0.4 |
| Biomet 66 organotin material | 0.7 | — | — |
| Water | to 10 gal. 37.85 L | to 10 gal. 37.85 L | to 10 gal. 37.85 L |

A number of beams of yarn of glass fibers were prepared from glass fibers that were chemically treated with the aqueous chemical treating composition of the preferred embodiment and that were oven dried. The beams were used to make reinforced tape at conditions of relative humidity of 83±5% (hygrometer measurement) and temperature of around 95° F. (35° C.). The yarn performed well under these conditions.

The chemically treated glass fibers of the present invention in the form of strand and yarn give better performance under high humidity conditions by yielding reduced gumming and processing to produce tape products. In addition, the yarn of the preferred embodiment is more lubricious which facilitates the processability of the strand and yarn into making reinforced tape products.

I claim:

1. Strands of chemically treated glass fibers, wherein the glass fibers have a moisture-reduced residue of an aqueous starch-oil chemical treatment, the improvement comprising:
   poly(oxypropylene) organic alcohol selected from the group consisting of poly(oxypropylene) glycol and poly(oxypropylene) polyol that is liquid and water soluble and that is essentially free of ethylene oxide groups being present in the moisture-reduced residue as the sole starch film-former modifier.

2. Strands of claim 1, wherein the poly(oxypropylene) organic alcohol has a molecular weight in the range of about 150 to 4,000.

3. Strands of claim 1, wherein the poly(oxypropylene) organic alcohol has a molecular weight in the range of about 400 to about 450.

4. Strands of claim 1 having additional ingredients selected from the group consisting of oil emulsifier, wax, wax emulsifier, cationic lubricant, wetting agent, and bacteriocide and mixtures thereof.

5. Strands of claim 1 having a moisture-reduced residue in an amount in the range of about 0.1 to about 2 weight percent LOI.

6. Strands of oil-starch chemically treated glass fibers having a moisture-reduced residue of an aqueous starch-oil chemical treating composition comprising:
   a. A predominant amount of the weight percent of the nonaqueous components of the aqueous chemical treatment comprised of a starch mixture having about 75 weight percent to about 95 weight percent of the mixture as an underivatizied, high amylose starch component and about 5 weight percent to about 25 weight percent of an easily cookable, low amylose starch component;
   b. wax selected from the group consisting of animal waxes, mineral waxes, synthetic waxes and petroleum waxes present in an amount less than the amount of starch mixture in the aqueous chemical treating composition;
   c. a nonionic oil lubricant selected from the group consisting of hydrogenated cotton seed oil, hydrogenated corn oil, hydrogenated soybean oil and hydrogenated vegetable oil and fatty triglycerides in an amount less than the amount of wax present in the aqueous chemical treating composition;
   d. at least one emulsifier to prepare at least one oil-in-water emulsion of the wax and oil present in an effective amount to produce the emulsion;
   e. a liquid water soluble poly(oxypropylene) organic alcohol that is essentially free of ethylene oxide moieties selected from the group consisting of poly(oxypropylene) glycol and poly(oxypropylene) polyol present as the sole starch film-former modifier;

f. a cationic lubricant in an effective cationic lubricating amount;

g. at least one wetting agent in an effective wetting agent amount;

h. water in an effective amount to apply the aqueous chemical treating composition to glass fibers.

7. Strands of claim 6, wherein the poly(oxypropylene) organic alcohol has a molecular weight in the range of 150 to 4,000.

8. Strands of claim 6, wherein the poly(oxypropylene) organic alcohol has a molecular weight in the range of 400 to 450.

9. Strands of claim 6, wherein the starch mixture has around 95 weight percent of the high amylose starch and around 5 weight percent of the highly crosslinked starch having approximately 50 percent amylose and granules having a diameter in the range of 3 to 20 nanometers.

10. Strands of claim 6, wherein the wax is present in an amount in the range of about 5 to about 35 weight percent of the nonaqueous components of the aqueous chemical treating composition.

11. Strands of claim 6, wherein the nonionic oil lubricant is present in an amount in the range of about less than 5 to less than 35 weight percent of the aqueous chemical treating composition.

12. Strands of claim 6, wherein at least one emulsifier has an HLB in the range of about 8 to about 20.

13. Strands of claim 6, wherein there is one emulsifier for the wax and one emulsifier for the oil lubricant.

14. Strands of claim 6, wherein the cationic lubricant is selected from the group consisting of alkyl imidazoline derivatives or fatty imidazoline derivatives of tetra-ethylene-pentamine and stearic acid present in an amount in the range of about 10 to about 45 weight percent of the nonaqueous components of the aqueous chemical treating composition.

15. Strands of claim 6, wherein the wetting agent is an octyl phenoxy poly-ethyleneoxy (ethanol) in an amount in the range of about 0.1 to about 2 weight percent of the nonaqueous components of the aqueous chemical treating composition.

16. Strands of claim 6, wherein in the aqueous chemical treating composition the ratio of wax to oil is in the range of about greater than 1 to 3:1.

17. Strands of starch-oil chemically treated glass fibers of claim 6 wherein the aqueous starch-oil chemical treating composition has:

a. the starch mixture having around 95 weight percent of the high amylose starch and around 5 percent of the highly crosslinked starch having approximately 50 percent amylose and granules having a diameter in the range of 3 to 20 nanometers, b. wax selected from the group consisting of animal waxes, vegetable waxes, mineral waxes, synthetic waxes and petroleum waxes present in an amount in the range of about 5 to about 35 weight percent of the nonaqueous components of the aqueous chemical treating composition, c. a nonionic oil lubricant selected from the group consisting of: hydrogenated cotton seed oil, hydrogenated corn oil, hydrogenated soybean oil, hydrogenated vegetable oil fatty triglycerides in an amount in the range of about less than 5 to less than 35 weight percent of the aqueous chemical treating composition, wherein in the aqueous chemical treating composition the ratio of wax to oil is in the range of about greater than 1:1 to 3:1;

d. at least one emulsifier to prepare at least one oil-in-water emulsion of the wax and oil present in an effective amount to produce the emulsion, wherein at least one emulsifier has an HLB in the range of about 8 to about 20;

e. a liquid water soluble poly(oxypropylene) organic alcohol that is essentially free of ethylene oxide moieties selected from the group consisting of poly(oxypropylene) glycol and poly(oxypropylene) polyol present as the sole starch film-former modifier;

f. cationic lubricant selected from the group consisting of alkyl imidazoline derivatives or fatty imidazoline derivatives of tetra-ethylene-pentamine and stearic acid present in an amount in the range of about 10 to about 45 weight percent of the nonaqueous components of the aqueous chemical treating composition;

g. an octyl phenoxy poly-ethyleneoxy (ethanol) wetting agent in an amount in the range of about 0.1 to about 2 weight percent of the nonaqueous components of the aqueous chemical treating composition; and h. water in an effective amount to apply the aqueous chemical treating composition to glass fibers.

* * * * *